(12) United States Patent
Ichihashi

(10) Patent No.: US 9,469,985 B1
(45) Date of Patent: Oct. 18, 2016

(54) ACOUSTIC STRUCTURES WITH MULTIPLE DEGREES OF FREEDOM

(71) Applicant: Hexcel Corporation, Dublin, CA (US)

(72) Inventor: Fumitaka Ichihashi, Chandler, AZ (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 14/708,382

(22) Filed: May 11, 2015

(51) Int. Cl.
  *G10K 11/172* (2006.01)
  *E04B 1/84* (2006.01)
  *F02K 1/34* (2006.01)

(52) U.S. Cl.
  CPC ............... *E04B 1/84* (2013.01); *B64D 33/06* (2013.01)

(58) Field of Classification Search
  CPC ............................. G10K 11/172; E04B 1/86
  USPC ........................................ 181/292, 286, 284
  See application file for complete search history.

(56) References Cited

U.S. PATENT DOCUMENTS

| | | | | |
|---|---|---|---|---|
| 3,887,031 A * | 6/1975 | Wirt | ............................ | E04B 1/86 181/286 |
| 3,952,831 A * | 4/1976 | Bernard | .................... | B32B 3/12 181/292 |
| 5,445,861 A * | 8/1995 | Newton | .................... | B32B 3/12 181/290 |
| 5,760,349 A * | 6/1998 | Borchers | ................ | B64G 1/002 181/286 |
| 7,434,659 B2 | 10/2008 | Ayles | | |
| 7,510,052 B2 * | 3/2009 | Ayle | ......................... | F02C 7/045 181/213 |
| 8,413,761 B2 | 4/2013 | Ayle | | |
| 8,607,924 B2 | 12/2013 | Ichihashi | | |
| 8,651,233 B2 | 2/2014 | Ayle | | |
| 8,800,714 B2 | 8/2014 | Ichihashi | | |
| 8,997,923 B2 * | 4/2015 | Ichihashi | .................. | B32B 3/10 181/292 |
| 9,068,345 B2 * | 6/2015 | Ichihashi | .................. | E04B 1/84 |

* cited by examiner

*Primary Examiner* — Forrest M Phillips
(74) *Attorney, Agent, or Firm* — W. Mark Bielawski; David J. Oldenkamp

(57) ABSTRACT

An acoustic structure having multiple degrees of acoustic freedom for reducing noise generated from a source. Acoustic septum caps, which are an integral part of the acoustic structure, include depth control portions that can be varied in width so that the septum portions of different septum caps can be located at different depths within the acoustic structure to provide an acoustic structure having multiple degrees of acoustic freedom even though the acoustic septum caps are anchored at the same depth within the structure.

18 Claims, 5 Drawing Sheets

ACOUSTIC STRUCTURES WITH MULTIPLE DEGREES OF FREEDOM

BACKGROUND OF THE INVENTION

1. Field of the Invention

The present invention relates generally to acoustic structures that are used to attenuate noise that emanates from a specific source. More particularly, the present invention is directed to providing acoustic structures that have multiple degrees of acoustic freedom.

2. Description of Related Art

It is widely recognized that the best way of dealing with excess noise generated by a specific source is to treat the noise at the source. This is typically accomplished by adding acoustic damping structures (acoustic treatments) to the structure of the noise source. One particularly problematic noise source is the jet engine used on most passenger aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine.

Honeycomb has been a popular material for use in aircraft and aerospace vehicles because it is relatively strong and lightweight. For acoustic applications, such as engine nacelles, acoustic materials are added to the honeycomb structure so that the honeycomb cells are acoustically closed at the end located away from the engine and covered with a porous covering at the end located closest to the engine. The closing of the honeycomb cells with acoustic material in this manner creates an acoustic resonator that provides attenuation, damping or suppression of the noise. Acoustic septums are also usually incorporated into the interior of the honeycomb cells in order to provide the resonator with additional noise attenuation properties.

One way of incorporating acoustic septums into the honeycomb cells is to first form planar acoustic inserts from an acoustic material, such as an acoustic mesh or perforated acoustic film. The planar acoustic inserts are made larger than the cell openings. Accordingly, when the inserts are pushed into the cells with a plunger, they are folded into an acoustic septum in the form of a cap. The cap shape provides an anchoring portion that contacts the cell walls and a central septum portion which attenuates the sound waves in the cell. Once inserted into the cells, the friction between the anchoring portion of the acoustic septum cap and the honeycomb walls temporarily locks the acoustic septum cap in place. An adhesive is then used to permanently bond the anchoring portions of the inserted acoustic septum caps to the cell walls.

The permanent bonding of the acoustic septum caps is accomplished by dipping the entire honeycomb into a pool of liquid adhesive. The depth to which the honeycomb is dipped into the adhesive is chosen so that the anchoring portions of the inserted acoustic septum caps are immersed in the liquid adhesive. This adhesive dip process is particularly effective because it provides simultaneous bonding of the many hundreds of acoustic septums that are located within a typical honeycomb acoustic structure.

In many acoustic situations, it is desirable to have honeycomb where the cells have different acoustic damping properties. For example, the depth at which the septum cap is anchored within each cell can be varied to provide cells with different acoustic damping properties. These types of acoustic structures are referred to as having multiple degrees of acoustic freedom due to the variability in acoustic properties of the cells.

There are a number of challenges associated with anchoring septum caps at different cell depths in order to form an acoustic structure with multiple degrees of acoustic freedom. For example, if septum caps are to be located at three different depths within the honeycomb, a first group of septum caps must be inserted to the deepest depth and then bonded in place by dipping the honeycomb into the pool of adhesive. Each dipping process leaves a film of adhesive over the entire honeycomb wall that is immersed in the pool of adhesive. After the adhesive for the first group of septum caps has solidified, a second group of septum caps is inserted to the middle depth and bonded in place by dipping again into the pool of liquid adhesive. After the second film of adhesive has solidified, a third group of septum caps is inserted to the shallowest depth and bonded in place by dipping yet again into the pool of liquid adhesive. As a result, three partially overlapping films of adhesive must be applied to the honeycomb walls in order to locate septum caps at three different depths.

The multiple adhesive films that are required to bond acoustic septums at different depths in the honeycomb causes an increase in the weight of the acoustic structure and may even alter the physical properties of the honeycomb. In addition, insertion of the second and third groups of planar acoustic inserts may be difficult due to the buildup of adhesive on the cell walls.

There presently is a need to design a planar acoustic insert that can be inserted into honeycomb cells to a single depth while at the same time providing an effective septum portion that can be located at different depths within the cell. Such a planar acoustic insert would allow one to make an acoustic structure with multiple degrees of freedom while only requiring a single dip into the adhesive pool to anchor the septum caps.

SUMMARY OF THE INVENTION

In accordance with the present invention, it was discovered that an acoustic structure can be made having multiple degrees of freedom where the septum portion of the septum caps are located at different depths within the cells while the anchoring portion of the septum caps are located at the same anchoring depth. The invention allows one to use a single application of adhesive to bond the anchoring portion of the septum caps to the acoustic cell walls while at the same time providing an acoustic structure that has multiple degrees of freedom.

The invention is based on using a set of planar acoustic inserts that are located in a honeycomb to form an acoustic structure having multiple degrees of acoustic freedom for reducing noise generated from a source. The honeycomb has a first edge that is located closest to the noise source and a second edge. The honeycomb includes a plurality of walls that form a plurality of cells wherein each of the cells has a cross-sectional area measured perpendicular to the walls. The acoustic structure also includes acoustic barriers that are located at the second edge of the honeycomb or within the cells to form acoustic resonators wherein the depth of each of the acoustic resonators is equal to the distance between the first edge of the honeycomb and the acoustic barrier.

The set of planar acoustic inserts is formed into septum caps when the set is inserted into the honeycomb cells. The set includes at least two different planar acoustic inserts. The first planar acoustic insert includes a first anchor portion having an outer edge that defines a perimeter of the first planar acoustic insert and a first interior anchor boundary that is spaced inward from said perimeter a first anchoring distance. As a feature of the invention, the first planar acoustic insert includes a first septum depth control portion which has an exterior boundary that coincides with the first interior anchor boundary and a first septum boundary wherein the first septum boundary is spaced inward from the exterior boundary of the first septum depth control portion a first depth control distance. The first planar acoustic insert also includes a first septum portion that is attached to the first septum boundary.

The second planar acoustic insert of the set includes a second anchor portion having an outer edge that defines a perimeter of the second planar acoustic insert and a second interior anchor boundary that is spaced inward from the perimeter a second anchoring distance. The second planar acoustic insert includes a second septum depth control portion which has an exterior boundary that coincides with the second interior anchor boundary and a second septum boundary wherein the second septum boundary is spaced inward from the exterior boundary of the second septum depth control portion a second depth control distance. The second planar acoustic insert also includes a second septum portion that is attached to the second septum boundary.

As a further feature of the invention, the second depth control distance of the second planar acoustic insert is different from the first depth control distance of the first planar acoustic insert. Accordingly, the set of first and second planar acoustic inserts can be formed into septum caps, which are anchored at the same depth within the honeycomb cells using a single adhesive application step, while at the same time providing septum portions that are located at different depths to form an acoustic structure with multiple degrees of acoustic freedom.

The invention is also directed to the acoustic structures made using the set of planar acoustic inserts as well as the methods for making the sets of planar acoustic inserts and the methods for making an acoustic structure using the set of planar acoustic inserts.

As an additional feature of the invention, a planar acoustic insert may be used alone and not as part of a set. In such situations, one or more planar inserts having the same desired planar acoustic anchor portion, septum depth control portion and septum portion may be located in the acoustic structure.

The above described and many other features and attendant advantages of the present invention will become better understood by reference to the following detailed description when taken in conjunction with the accompanying drawings.

DETAILED DESCRIPTION OF THE INVENTION

Figure 1:
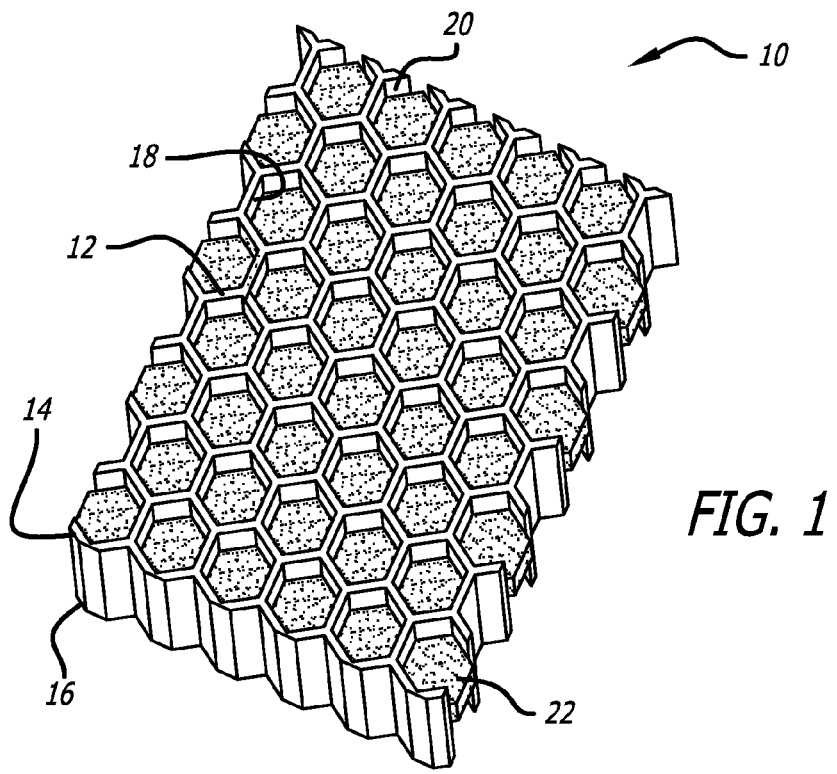
FIG. 1 is a perspective view of an exemplary acoustic structure in accordance with the present invention.

An exemplary acoustic honeycomb for use in an acoustic structure in accordance with the present invention is shown generally at 10 in FIG. 1. The acoustic honeycomb 10 includes a honeycomb 12 having a first edge 14 which is to be located nearest the noise source and a second edge 16. The acoustic honeycomb 10 includes walls 18 that extend between the two edges 14 and 16 to define a plurality of cells 20. Each of the cells 20 has a depth (also referred to as the core thickness) that is equal to the distance between the two edges 14 and 16. Each cell 20 also has a cross-sectional area that is measured perpendicular to the cell walls 18.

Figure 9:
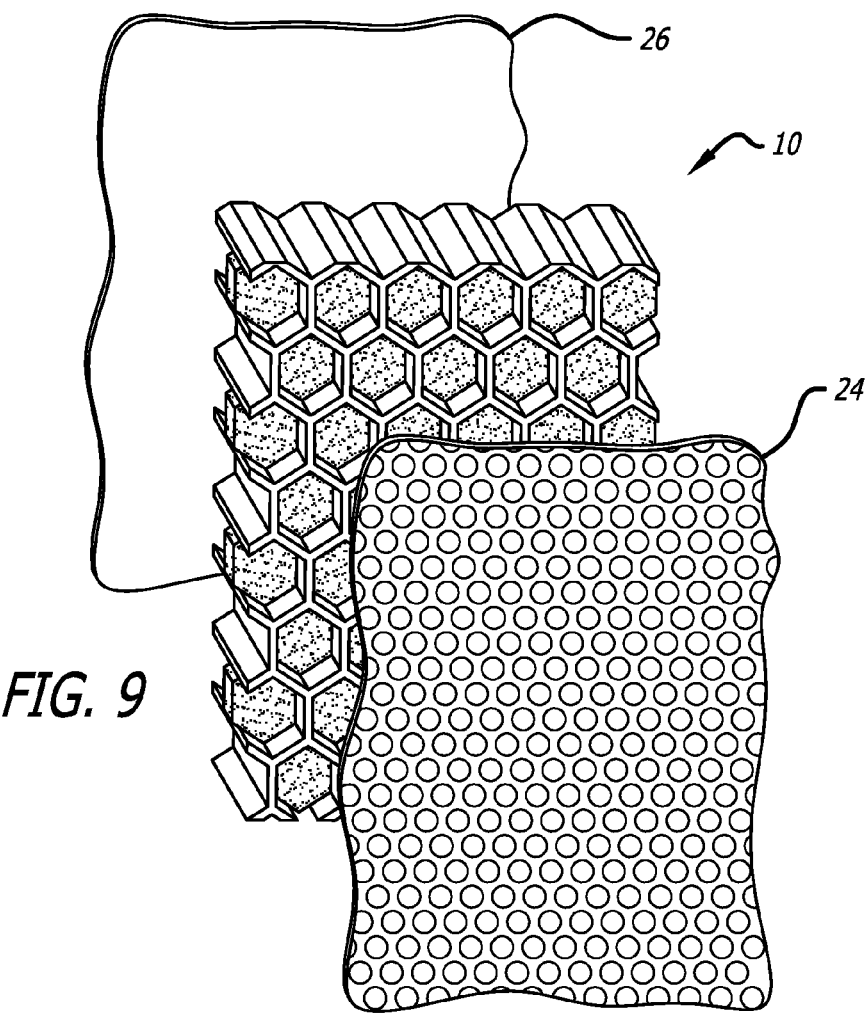
FIG. 9 is an exploded view showing the acoustic honeycomb prior to being bonded to an acoustic barrier panel on one side and a sound permeable mesh on the other.

As shown in FIG. 9, the acoustic honeycomb 10 is typically located between a porous face sheet 24 and a solid acoustic barrier face sheet 26. The solid acoustic barrier face sheet 26 forms an acoustic barrier at the bottom of the acoustic cells 20 that corresponds to the second edge 16 of the honeycomb. Individual acoustic barriers may be inserted into the cells 20 when it is desired that the acoustic bottom of the cells does not correspond to the second edge 16 of the honeycomb 10.

Acoustic septum caps 22 are located in each of the cells 20. The septum caps 22 have an anchoring portion that is bonded to the cell walls and a septum portion that extends transversely across the cell. The present invention is directed to making acoustic honeycomb 10 where the septum portions of the septum caps are located at different depths within the cells 20. Acoustic honeycomb that have septum portions located at different depths in the honeycomb are referred to as having multiple degrees of freedom.

Figure 2:
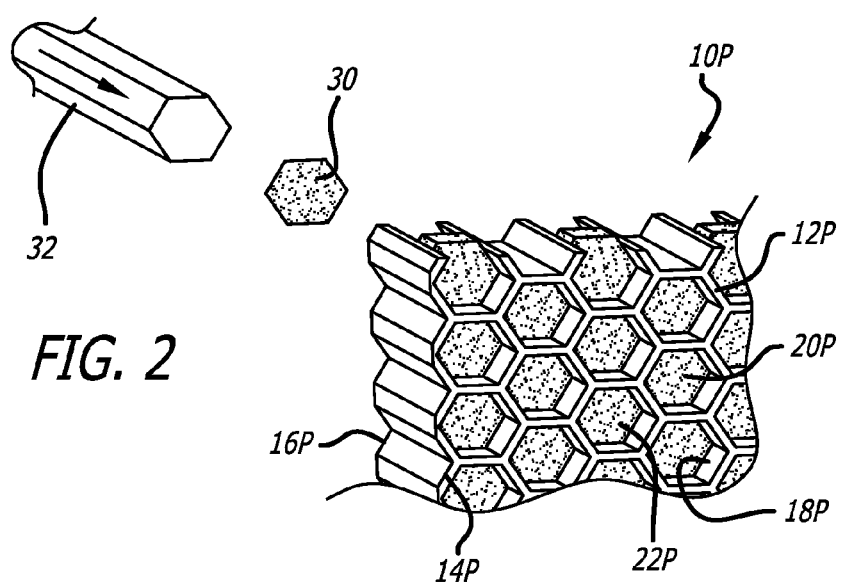
FIG. 2 is a simplified view showing how a planar acoustic insert is pressed into the acoustic honeycomb to form an acoustic septum cap that is friction-locked within the honeycomb cell.

As shown in FIG. 2, the septum caps 22P are formed from planar acoustic inserts 30 that are pressed with a plunger 32 into a honeycomb 10P. The identifying numbers in FIG. 2 correspond to the numbers in FIG. 1, except that a P is added to indicate that the honeycomb is a precursor structure that still requires permanent bonding of the septum caps 22P in order to form the final acoustic honeycomb 10. The acoustic inserts 30 are larger than the cell openings so that they are formed into a cap shape during insertion into the cells 20P. The resulting septum caps are friction-locked in place by the inherent bounce back of the acoustic insert material. If desired, numerous plungers can be used to simultaneously insert numerous planar acoustic inserts.

Figure 3:
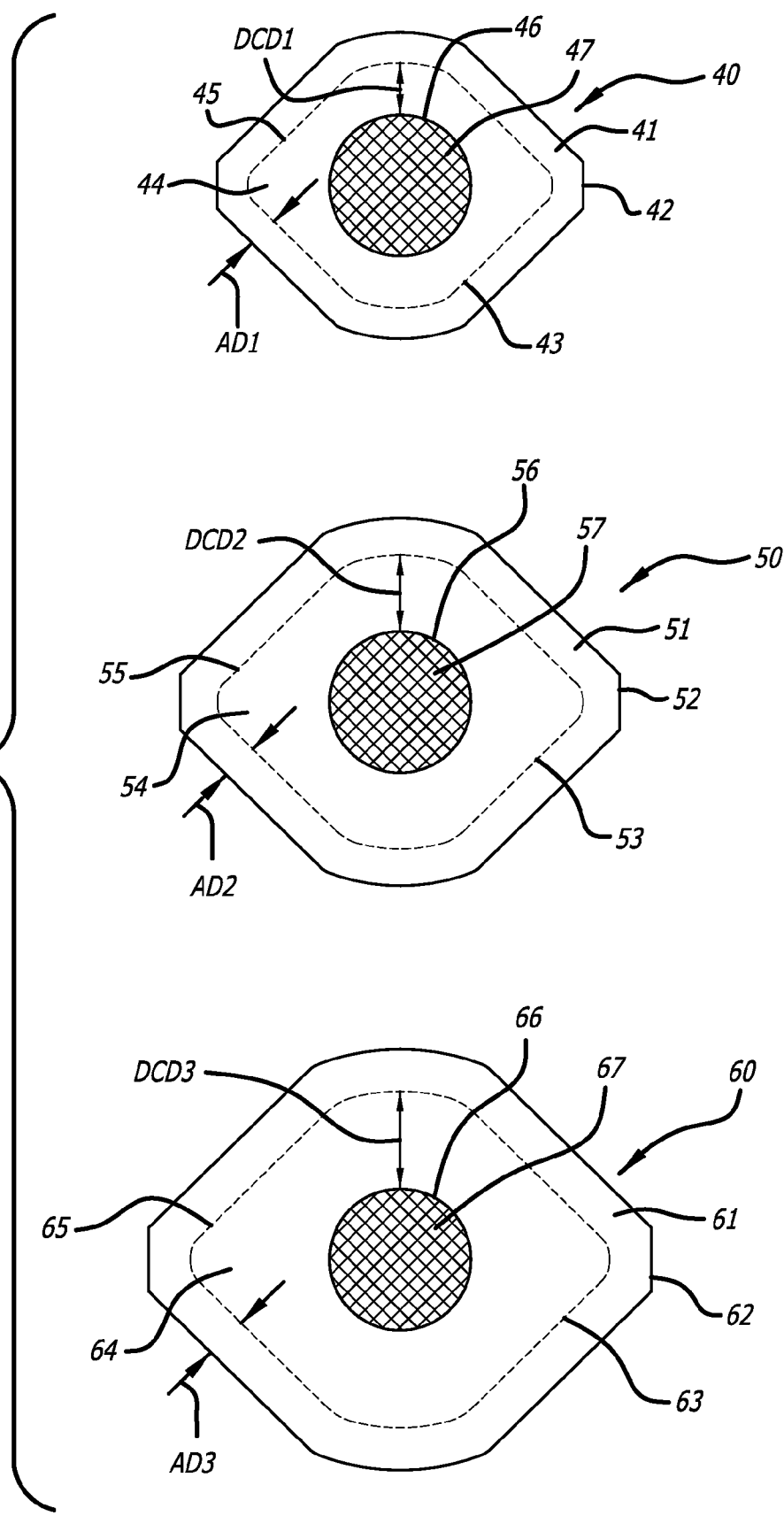
FIG. 3 shows an exemplary set of planar acoustic inserts in accordance with the present invention

In accordance with the present invention, a set of planar acoustic inserts are used in the same manner as acoustic inserts 30 to form an acoustic structure having multiple degrees of freedom for reducing noise generated from a source. An exemplary set of three planar acoustic inserts are shown in FIG. 3. The set includes: a first planar acoustic septum 40; a second planar acoustic septum 50; and a third planar acoustic septum 60. There must be at least two different planar acoustic inserts (e.g. 40 and 50) in the set in order to form an acoustic structure having multiple degrees of freedom. The number of different acoustic inserts in the set may be greater than three. A set of three acoustic inserts is described herein for exemplary purposes with it being understood that the number of different acoustic inserts in a set is only limited by the number of multiple degrees of freedom that are desired for a given acoustic structure. In addition, it will be recognized that that the number of a particular type of planar acoustic insert (e.g. 40, 50 or 60) that is inserted into any given acoustic honeycomb can range up to a thousand or more.

The first planar acoustic insert 40 includes a first anchor portion 41 that has an outer edge 42 that defines the perimeter of the first acoustic insert 40 and a first interior boundary shown in phantom at 43. The first interior boundary 43 is spaced inward from the outer edge 42 a first anchoring distance shown at AD1. The first acoustic insert 40 also includes a first septum depth control portion 44. The exterior boundary 45 of the first septum depth control portion 44 coincides with the first interior boundary 43 of the first anchor portion 41. The first septum depth control portion 44 also includes a first septum boundary 46 that is spaced inward from the exterior boundary 45 a first depth control distance DCD1. A first septum portion 47 is located in the center of the first acoustic insert 40. The perimeter of the first septum portion 47 is attached to the first septum control portion 44 along septum boundary 46.

The second planar acoustic insert 50 includes a second anchor portion 51 that has an outer edge 52 that defines the perimeter of the second acoustic insert 50 and a second interior boundary shown in phantom at 53. The second interior boundary 53 is spaced inward from the outer edge 52 a second anchoring distance shown at AD2. The second acoustic insert 50 also includes a second septum depth control portion 54. The exterior boundary 55 of the second septum depth control portion 54 coincides with the second interior boundary 53 of the second anchor portion 51. The second septum depth control portion 54 also includes a second septum boundary 56 that is spaced inward from the exterior boundary 55 a second depth control distance DCD2. A second septum portion 57 is located in the center of the second acoustic insert 50. The perimeter of the second septum portion 57 is attached to the second septum control portion 54 along septum boundary 56.

The third planar acoustic insert 60 includes a third anchor portion 61 that has an outer edge 62 that defines the perimeter of the acoustic insert 60 and a third interior boundary shown in phantom at 63. The third interior boundary 63 is spaced inward from the outer edge 62 a third anchoring distance shown at AD3. The acoustic insert 60 also includes a third septum depth control portion 64. The exterior boundary 65 of the third septum depth control portion 64 coincides with the third interior boundary 63 of the third anchor portion 61. The third septum depth control portion 64 also includes a third septum boundary 66 that is spaced inward from the exterior boundary 65 a third depth control distance DCD3. A third septum portion 67 is located in the center of the third acoustic insert 60. The perimeter of the third septum portion 67 is attached to the third septum control portion 64 along septum boundary 66.

The anchoring distances AD1, AD2 and AD3 are preferably the same for each of the acoustic inserts. It is not necessary that the anchoring distances are the same provided that the interior boundaries 43, 53 and 63 are located within the honeycomb at the same depth. For example, AD3 can be greater than either AD2 or AD1 to provide extra bonding surface for the larger acoustic insert 60. However, the interior boundary 63 of the anchor portion 61 should be located at the same depth within the honeycomb cells as the interior boundaries 43 and 53 of septum caps 41 and 51, respectively. Accordingly, the anchor or anchoring depth of a septum cap is considered to be the location of the interior boundary of the anchor portion once the acoustic insert has been placed within a cell.

As a feature of the invention, the depth control distances DCD1, DCD2 and DCD3 are different. The different depth control distances result in the septum portions being located at different depths in the honeycomb to provide multiple degrees of acoustic freedom. Locating the interior boundaries of the anchor portions at the same depth allows the septum caps to be anchored using a single dip in adhesive while at the same time locating the septum portions at different depths.

Figure 4:
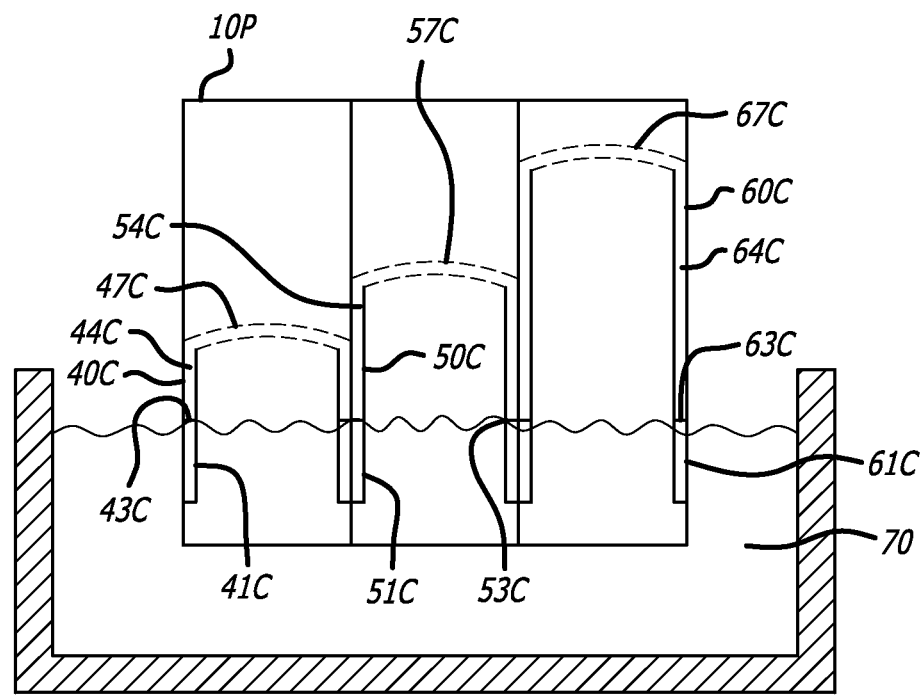
FIG. 4 is a side view showing an exemplary process for applying adhesive to the anchor portions of the set of acoustic inserts after they have been inserted into the honeycomb to form acoustic septum caps.

FIG. 4 shows a portion of the honeycomb 10P in which the first, second and third planar acoustic inserts have been located in the honeycomb cells to form a first acoustic septum cap 40C, second acoustic septum cap 50C and third acoustic septum cap 60C. The identifying numbers in FIG. 4 match the identifying numbers in FIG. 3, except that "C" has been added to indicate that the planar septum inserts have been formed into acoustic septum caps during the insertion process. The anchor portions 41C, 51C and 61C are all located at the same anchoring depth so that the pool of adhesive 70 covers them equally. The different depth control distances result in the septum portions 47C, 57C and 67C being located at different depths within the acoustic honeycomb in order to provide the desired multiple degrees of freedom.

Figure 5:
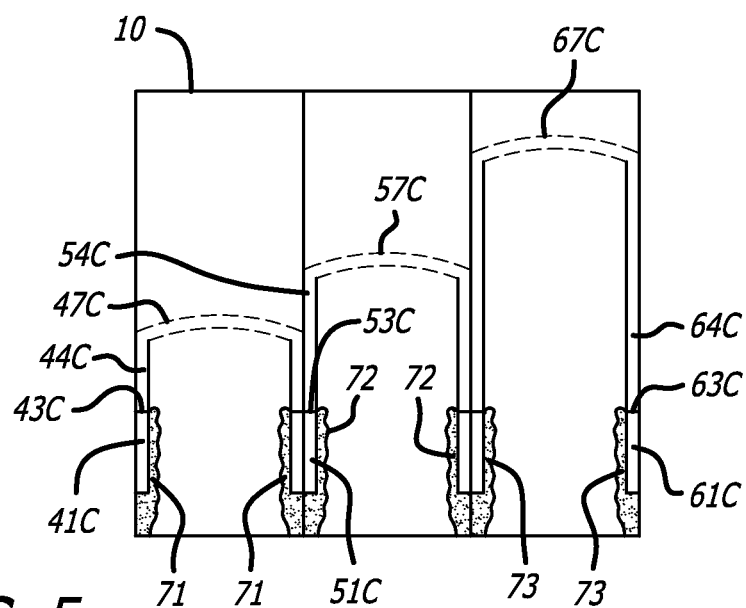
FIG. 5 is a side view showing the honeycomb after the acoustic septum caps have been bonded in place.

The honeycomb 10P is removed from the adhesive pool 70 and the liquid adhesive is allowed to dry or cure to form the honeycomb 10. In honeycomb 10, the acoustic septum caps 40C, 50C and 60C are permanently bonded to the honeycomb by adhesive at 71, 72 and 73, respectively, as shown in FIG. 5. Any of the liquid adhesives typically used to bond septum caps to honeycomb walls may be used. Preferred liquid adhesives include those that are stable at high temperature (150-200° C.). Exemplary liquid adhesives include epoxies, acrylics, phenolics, cyanoacrylates, bismaleimides, polyamide-imides, and polyimides.

In FIG. 3, the anchoring distances AD1, AD2 and AD3 for the three inserts are shown as being the same. The anchoring distances are determined by the location of the septum within the cell and the depth of dipping into the adhesive pool 70. As shown in FIG. 4, the bottom edges of the septum inserts are all located at the same depth so that the adhesive is applied over the same anchoring distances up to the interior boundaries 43C, 53C and 63C. In order for the septum portions to be located at different depths in the cell, the depth control distances must be varied. As a result, the combined anchoring and depth control distances for the septums will vary.

If desired, a set of septums may be used where the combined overall anchoring distance and depth control distance is the same for each septum of the set. In this case, the bottom of the septa are located at different depths within the cell, which inherently places the septum portions at different depths. The anchoring distances for the septa are different because the interior boundaries are all at the same depth, as controlled by the level of the adhesive pool during adhesive application, while the bottoms or perimeters of the septa are located at different depths. Since the combined anchoring distance and depth control distance is the same for each septum of the set, the difference in anchoring distance creates differences in the depth control distances, which is the portion of the septum located between the interior boundary and the septum portion. This difference in depth control distances, which occurs due to varying the anchoring distance, provides location of the septum portions at different depth using a single adhesive application step and a septum set where all of the septum caps have the same tail length (AD+DCD).

The materials used to make the honeycomb 10 can be any of those typically used in acoustic structures including metals, ceramics and composite materials. Exemplary metals include aluminum and aluminum alloys. Exemplary composite materials include fiberglass, Nomex and various combinations of graphite or ceramic fibers with suitable matrix resins. Matrix resins that can withstand relatively high temperatures (150 to 200° C.) are preferred. The materials used to make the solid acoustic barrier sheet 26 can also be any of the solid face sheet materials commonly used for acoustic structures which typically include the same type of materials used to make the honeycomb structure. The materials used to make the porous face sheet 24 can also be any of the materials commonly used for such porous structures provided that the pores or perforations in the structure are sufficient to allow the sound waves from the jet engine or other noise source to enter into the acoustic cells or resonators.

The anchor portions and septum depth control portions of the acoustic inserts are preferably made from a thin solid plastic film that is sufficiently flexible to be folded to form the acoustic septum caps. These thin solid films can be made from polyamide, such as polyamide 6 (Nylon 6, PA6) and polyamide 12 (Nylon 12, PA12), polyester, polyethylene chlorotrifluoroethylene (ECTFE), ethylene tetrafluoroethylene (ETFE), polytetrafluoroethylene (PTFE), polyphenylene sulfide (PPS), polyfluoroethylene propylene (FEP) and polyether ether ketone (PEEK). Thin sheets or films of PEEK are preferred. Such solid films are available commercially from a number of sources, such as Victrex USA (Greenville, S.C.) which produces sheets of PEEK under the tradename VICTREX® PEEK™ polymer. The films used to make the anchor portions and septum depth control portions will typically have a thickness of from 0.001 to 0.006 inch. The films may be perforated to reduce weight and to also increase the surface area of the film for adhesive bonding of the anchor portion to the cell wall.

The anchor portion and septum depth control portion of a given acoustic insert are preferably made from a single piece of plastic film. The interior anchor boundary of the anchor portion and the exterior boundary of the septum depth control portion coincide with each other (see 43, 53 and 63). The various planar acoustic inserts in a given set of inserts are pushed into the honeycomb cells so that the coincident boundaries of the anchor portions and septum depth control portions are at the same depth or at least close enough to the same depth that a single application of liquid adhesive to the anchor portions is possible. This insures that the septum portions will be located at varying depths within the honeycomb cells to provide an acoustic structure with multiple degrees of freedom.

The anchoring distances for the anchor portions of the planar acoustic inserts will typically range from 2 mm to a distance that is less than the depth of the honeycomb cells. The depth control distances for the septum depth control portions for such acoustic structures will typically range from 0 up to a distance that is less than the depth of the honeycomb cell. The difference in depth control distances between different planar acoustic inserts can vary widely and is limited by the depth of the honeycomb cell the anchoring distances the location of the anchor portion within the cell and the desired multiple degrees of acoustic freedom.

The septum portion of the acoustic insert is preferably made from an open mesh fabric that is woven from monofilament fibers. The fibers may be composed of glass, carbon, ceramic or polymers. Monofilament polymer fibers made from polyamide, such as polyamide 6 (Nylon, 6 PA6) and polyamide 12 (Nylon 12, PA12), polyester, polyethylene chlorotrifluoroethylene (ECTFE), ethylene tetrafluoroethylene (ETFE), polytetrafluoroethyloene (PTFE), polyphenylene sulfide (PPS), polyfluoroethylene propylene (FEP), polyether ether ketone (PEEK), are a few examples. It is preferred that the material used to make the septum portion match the material that is used to make the anchor portion and septum depth control portion. Open mesh fabric made from PEEK is preferred for high temperature applications. Open mesh acoustic fabrics and other acoustic materials that may be used to form the septum caps in accordance with the present invention are available from a wide variety of commercial sources. For example, sheets of open mesh acoustic fabric may be obtained from SEFAR America Inc. (Buffalo Division Headquarters 111 Calumet Street Depew, N.Y. 14043) under the trade names SEFAR PETEX, SEFAR NITEX and SEFAR PEEKTEX.

It was discovered that the combination of a septum portion made from an open mesh fabric with an anchor portion and septum depth control portion made from a solid film of plastic provides an optimum combination of acoustic properties and septum strength. Especially preferred are combinations of PEEK open mesh fabric septum portions with anchor and septum portions that are PEEK solid film. The PEEK open mesh fabric septum portions, when combined with the solid plastic anchor and depth control portions, are flatter and more uniform in shape than the acoustic portion of a septum made entirely from mesh. The flatter septum portions make it possible to create acoustic structures where the depth of the septum portions are uniform and can be carefully controlled.

The septum portion is attached to the septum depth control portion along the septum boundary (e.g. 46, 56 and 66 in FIG. 3) of the septum depth control portions. It is preferred that this attachment is achieved by welding the septum depth control portion to the septum portion. Welding is accomplished using known welding techniques for joining two pieces of plastic together. The septum portion may also be attached to the septum depth control portion using an adhesive.

The set of planar acoustic inserts may include one or more inserts that have septum portions made from a solid polymer film of the type used for the anchoring portions and septum depth control portions. The inclusion of such solid planar acoustic inserts allows one to locate acoustic barriers at different depths in the cells at the same time as the other mesh-containing acoustic inserts from the set are placed in the honeycomb. The same single adhesive application step can then be used to bond both the solid acoustic inserts of the set along with the mesh-containing acoustic inserts because they all are anchored at the same anchoring depth.

The septum portion may be in any shape that is typically used in acoustic structures. The septum may be in the form of a circular disk as shown in FIG. 3. The septum may also be in the shape of an ellipse or oval. The septum portion may also be in the shape of a polygon, such as a square, rectangle, hexagon or octagon.

The cross-sectional area of the septum portion can be close to or equal to the cross-sectional area of the honeycomb cells. As shown in FIG. 5, the cross-sectional area or size of the septum portions 47C, 57C and 67C are close to the size of the honeycomb cells. The cross-sectional area of the septum portion can be less than the size of the cells. For example, septum portions that have a cross-section area of ⅛ to ⅞ of the cell cross-section area may be used. In addition, the cross-sectional sizes of the septum portions can be varied between multiple septum caps located within the honeycomb in order to provide additional control over the acoustic properties of the structure.

Figure 6:
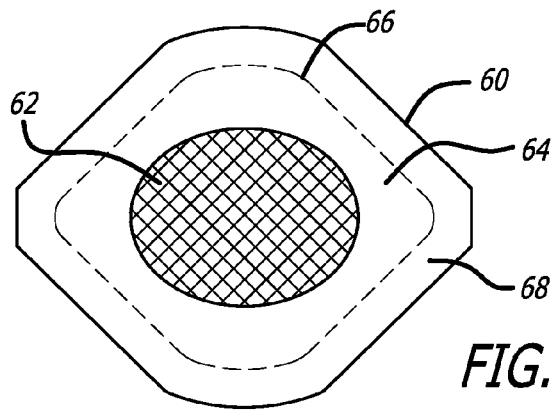
FIG. 6 is a top view of an exemplary planar acoustic insert in accordance with the present invention where the septum portion is in the shape of an oval or ellipse.

An exemplary planar acoustic insert 60 is shown in FIG. 6 where an elliptical septum portion 62 is attached by welding or adhesive to the septum depth control portion 64. The septum depth control portion 64 shares a common boundary 66 (shown in phantom) with anchor portion 68. A set of this type of planar acoustic inserts will include at least two inserts where the depth control distance from the septum portion 62 to the common boundary 66 is different.

Figure 7:
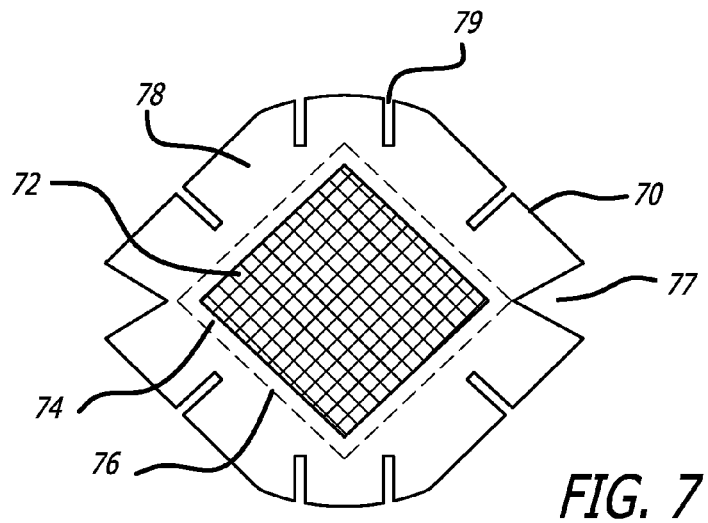
FIG. 7 is a top view of an exemplary planar acoustic insert in accordance with the present invention where the septum portion is in the shape of a square and wherein the anchor portion includes a few notches and slits that extend transversely through the anchor portion.

Another exemplary planar acoustic insert 70 is shown in FIG. 7 where a square septum portion 72 is attached by welding or adhesive to the septum depth control portion 74. The septum depth control portion 74 shares a common boundary 76 (shown in phantom) with anchor portion 78. The acoustic insert 70 includes notches 77 and slits 79 that are designed to enhance folding of the planar acoustic insert 70 when it is pushed into a honeycomb cell. The notches 77 and slits 79 preferably extend from the perimeter of the acoustic insert 70 to the interior boundary 76 of the anchor portion 78. A set of this type of planar acoustic inserts will include at least two inserts where the depth control distance from the septum portion 72 to the boundary 76 is different.

Figure 8:
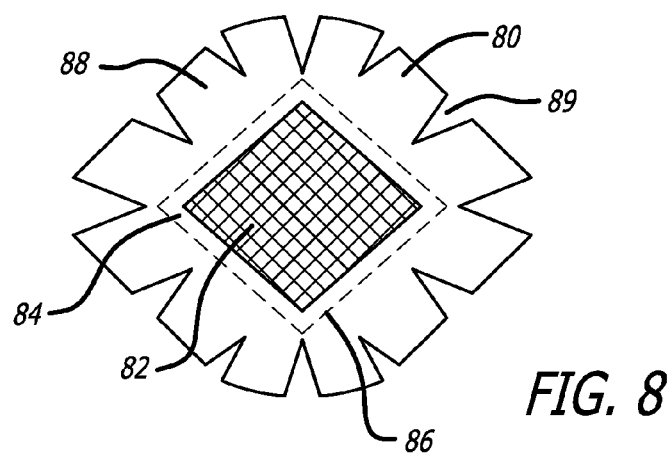
FIG. 8 is a top view of an exemplary planar acoustic insert in accordance with the present invention where the septum portion is in the shape of a square and wherein the anchor portion includes a numerous notches that extend transversely through the anchor portion.

A further exemplary planar acoustic insert 80 is shown in FIG. 8 where a square septum portion 82 is welded or adhered to the septum depth control portion 84. The septum depth control portion 84 shares a common boundary 86 (shown in phantom) with anchor portion 88. The acoustic insert 80 includes numerous notches 89 that are designed to enhance folding of the planar acoustic insert 80 when it is pushed into a honeycomb cell. The notches 89 preferably extend is some locations from the perimeter of the acoustic insert 80 to the interior boundary 86 of the anchor portion 88. A set of this type of planar acoustic inserts will include at least two inserts where the depth control distance from the septum portion 82 to the boundary 86 is different. For example, an exemplary set would include five different groups of planar acoustic inserts where the depth control distance for each group is different and where each group includes hundreds of planar acoustic inserts. The five different groups of acoustic inserts are placed into the honeycomb cells so that the interior boundaries of the anchor portions are located at the same depth. This provides for septum portions located at five different depths to give the acoustic structure multiple degrees of freedom.

It is preferred that the planar inserts be used as a set to provide multiple degrees of freedom. However, the unique structure of the inserts makes them suitable for use alone as individual insert types and not as part of set designed to provide multiple degrees of freedom. Acoustic structures having a single type of one or more of the above-described planar inserts are possible where the septum portions of the insert may all be the same length or different lengths.

Figure 10:
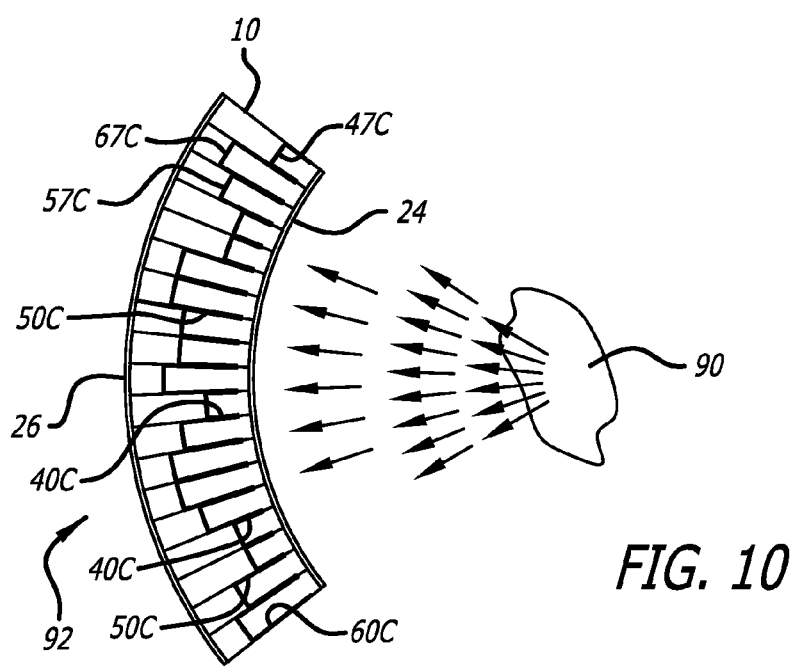
FIG. 10 shows an exemplary acoustic structure in accordance with the present invention in place for attenuating sound from a source of noise.

Although the acoustic structure of the present invention may be used for damping noise from a wide variety of noise sources, the acoustic structure is particularly well-suited for damping noise generated by aircraft engines and particularly the large engines used for commercial aircraft. Accordingly, the acoustic structure shown in FIG. 9 is typically part of a nacelle which surrounds the central core of a turbofan jet engine represented generally at 90 in FIG. 10. The location of various exemplary septum caps 40C, 50C and 60C, which are formed from the exemplary set of planar acoustic inserts, are shown in position within the honeycomb 10 where they have been anchored at the same depth. The various septum portions 47C, 57C and 67C are located at different depths within the honeycomb to provide the nacelle with multiple degrees of acoustic freedom.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An acoustic structure having multiple degrees of acoustic freedom for reducing noise generated from a source, said acoustic structure comprising:

A) a honeycomb comprising a first edge to be located closest to said source and a second edge, said honeycomb comprising a plurality of walls that extend between said first and second edges, said walls defining a plurality of cells wherein each of said cells has a cross-sectional area measured perpendicular to said walls;

B) acoustic barriers located at the second edge of said honeycomb or within said cells to form acoustic resonators wherein the depth of each of said acoustic resonators is equal to the distance between the first edge of said honeycomb and said acoustic barrier;

C) a first acoustic septum cap comprising:

a first anchor portion for anchoring said first acoustic septum cap to said walls at first anchoring depth within one of said cells, said first anchor portion having an outer edge that defines a perimeter of said first acoustic septum cap and a first interior anchor boundary that is spaced from said perimeter a first anchoring distance, said first anchor portion extending parallel to said walls and being bonded thereto with an adhesive that extends from said outer edge of the first anchor portion to said first interior anchor boundary, said first interior anchor boundary being located at said first anchoring depth;

a first septum depth control portion which comprises an exterior boundary that coincides with said first interior anchor boundary and a first septum boundary wherein said first septum boundary is spaced from the exterior boundary of said first septum depth control portion a first depth control distance, said first septum depth control portion extending parallel to said walls;

a first septum portion that is attached to said first septum boundary, said first septum portion extending transverse to said walls; and D) a second acoustic septum cap comprising:
  a second anchor portion for anchoring said second acoustic septum cap to said walls at a second anchoring depth within another one of said cells, said second anchor portion having an outer edge that defines a perimeter of said second acoustic septum cap and a second interior anchor boundary that is spaced from said perimeter a second anchoring distance, said second anchor portion extending parallel to said walls and being bonded thereto with an adhesive that extends from said outer edge of the second anchor portion to said second interior anchor boundary, said second interior anchor boundary being located at said second anchoring depth;
  a second septum depth control portion which comprises an exterior boundary that coincides with said second interior anchor boundary and a second septum boundary wherein said second septum boundary is spaced from the exterior boundary of said second septum depth control portion a second depth control distance, said second septum depth control portion extending parallel to said walls and wherein said second depth control distance is different from said first depth control distance;
  a second septum portion that is attached to the second septum boundary, said first septum portion extending transverse to said walls, wherein the first anchoring depth to which said adhesive extends is equal to the second anchoring depth to which said adhesive extends and wherein said first septum portion and said second septum portion are located at different depths within said cells due to said second septum depth control distance being different from said first depth control distance to thereby provide said acoustic structure having multiple degrees of acoustic freedom.

2. An acoustic structure having multiple degrees of acoustic freedom according to claim 1 which further comprises:
  a third acoustic septum cap comprising:
    a third anchor portion for anchoring said third acoustic septum cap to said walls at a third anchoring depth within a further one of said cells, said third anchor portion having an outer edge that defines a perimeter of said third acoustic septum cap and a third interior anchor boundary that is spaced from said perimeter a third anchoring distance, said third anchor portion extending parallel to said walls and being bonded thereto with an adhesive that extends from said outer edge of the third anchor portion to said third interior anchor boundary, said third interior anchor boundary being located at said third anchoring depth;
    a third septum depth control portion which comprises an exterior boundary that coincides with said third interior anchor boundary and a third septum wherein said third septum boundary is spaced from the exterior boundary of said third septum depth control portion a third depth control distance, said third septum depth control portion extending parallel to said walls and wherein said third depth control distance is different from said first depth control distance and second depth control distance;
    a third septum portion that is attached to the third septum boundary, said third septum portion extending transverse to said walls, wherein the first anchoring depth to which said adhesive extends is equal to the third anchoring depth to which said adhesive extends and wherein said first septum portion, said second septum portion and said third septum portion are located at different depths within said cells due to said third septum depth control distance being different from said first depth control distance and said second depth control distance to thereby provide said acoustic structure having multiple degrees of acoustic freedom.

3. An acoustic structure having multiple degrees of acoustic freedom according to claim 1 wherein said first septum portion and said second septum portion are in the shape of a polygon or circular disk that has a cross-sectional area and wherein the cross-sectional area of said disk is less than the cross-sectional area of said cell.

4. An acoustic structure having multiple degrees of acoustic freedom according to claim 3 wherein the cross-sectional area of said first septum portion is different from the cross-section are of said second septum portion.

5. An acoustic structure having multiple degrees of acoustic freedom according to claim 3 wherein said polygon has four sides.

6. An acoustic structure having multiple degrees of acoustic freedom according to claim 1 wherein said first and second anchor portions and said first and second septum depth control portions are made of plastic film that is impervious to sound waves and wherein said first and second septum portions comprise an acoustic mesh consisting of plastic monofilament fiber.

7. An acoustic structure having multiple degrees of acoustic freedom according to claim 6 wherein said first anchoring distance and said second anchoring distance are different.

8. An engine nacelle comprising an acoustic structure having multiple degrees of acoustic freedom according to claim 1.

9. An airplane comprising an engine nacelle according to claim 2.

10. A method for reducing the noise generated from a source of noise, said method comprising the step of at least partially surrounding said source of noise with an acoustic structure having multiple degrees of acoustic freedom according to claim 1.

11. An acoustic structure having multiple degrees of acoustic freedom according to claim 1 wherein said first anchoring distance and said second anchoring distance are different.

12. An acoustic structure having multiple degrees of acoustic freedom according to claim 1 wherein said first anchoring distance and said second anchoring distance are the same.

13. An acoustic structure having multiple degrees of acoustic freedom according to claim 2 wherein said first anchoring distance, said second anchoring distance and said third anchoring distance are different.

14. An acoustic structure having multiple degrees of acoustic freedom according to claim 2 wherein said first anchoring distance, said second anchoring distance and said third anchoring distance are the same.

15. A method for making an acoustic structure having multiple degrees of acoustic freedom for reducing noise generated from a source, said method comprising the steps of:
  A) providing a honeycomb comprising a first edge to be located closest to said source and a second edge, said honeycomb comprising a plurality of walls that extend between said first and second edges, said walls defining a plurality of cells wherein each of said cells has a cross-sectional area measured perpendicular to said walls;

B) locating acoustic barriers at the second edge of said honeycomb or within said cells to form acoustic resonators wherein the depth of each of said acoustic resonators is equal to the distance between the first edge of said honeycomb and said acoustic barrier;

C) inserting a first planar acoustic insert into one of said cells to form:
  a first acoustic septum cap comprising:
    a first anchor portion for anchoring said first acoustic septum cap to said walls at first anchoring depth within one of said cells, said first anchor portion having an outer edge that defines a perimeter of said first acoustic septum cap and a first interior anchor boundary that is spaced from said perimeter a first anchoring distance and wherein said first interior anchor boundary is located at said first anchoring depth;
    a first septum depth control portion which comprises an exterior boundary that coincides with said first interior anchor boundary and a first septum boundary wherein said first septum boundary is spaced from the exterior boundary of said first septum depth control portion a first depth control distance, said first septum depth control portion extending parallel to said walls;
    a first septum portion that is attached to said first septum boundary said first septum portion extending transverse to said walls;

D) inserting a second planar acoustic insert into an other one of said cells to form:
  a second acoustic septum cap comprising:
    a second anchor portion for anchoring said second acoustic septum cap to said walls at a second anchoring depth within said other one of said cells, said second anchor portion having an outer edge that defines a perimeter of said second acoustic septum cap and a second interior anchor boundary that is spaced from said perimeter a second anchoring distance and wherein said second interior anchor boundary is located at said second anchoring depth;
    a second septum depth control portion which comprises an exterior boundary that coincides with said second interior anchor boundary and a second septum boundary wherein said second septum boundary is spaced from the exterior boundary of said second septum depth control portion a second depth control distance, said second septum depth control portion extending parallel to said walls and wherein said second depth control distance is different from said first depth control distance;
    a second septum portion that is attached to the second septum boundary wherein said first septum portion extending transverse to said walls, wherein said first acoustic cap is located at the same anchoring depth as said second acoustic cap so that said first and second interior anchor boundaries are located at the same depth within said cells; and E) bonding said first anchor portion and said second anchor portion to said walls at said anchoring depth, said bonding comprising the step of simultaneously applying an adhesive to said first and second anchor portions so that said adhesive extends from said outer edges of the first and second anchor portions to said first and second interior anchor boundaries to thereby locate said first and second septum portions at different depths within said cells due to said first septum depth control distance being different from said second septum depth control distance.

16. A method for making an acoustic structure having multiple degrees of acoustic freedom according to claim 15 wherein said acoustic structure is a nacelle for a jet engine.

17. A method for making an acoustic structure having multiple degrees of acoustic freedom according to claim 15 wherein said first anchoring distance and said second anchoring distance are different.

18. A method for making an acoustic structure having multiple degrees of acoustic freedom according to claim 15 wherein said first anchoring distance and said second anchoring distance are the same.

* * * * *